United States Patent [19]

Brothers et al.

[11] 4,230,913

[45] Oct. 28, 1980

[54] LINE CONCENTRATOR

[75] Inventors: Gene A. Brothers, Scottsbluff; John A. Neely; Patrick W. Kieffe, both of Gering, all of Nebr.

[73] Assignee: Eltra Corporation, Toledo, Ohio

[21] Appl. No.: 956

[22] Filed: Jan. 4, 1979

[51] Int. Cl.³ .............................. H04Q 3/60; H04J 3/00
[52] U.S. Cl. .................................................. 179/18 FC
[58] Field of Search ........... 179/18 FC, 15 AT, 18 E, 179/16 A, 18 ES

[56] References Cited

U.S. PATENT DOCUMENTS

| | | | |
|---|---|---|---|
| 3,778,555 | 12/1973 | Nordling et al. ................. | 179/18 FC |
| 3,917,908 | 11/1975 | Galluccio ......................... | 179/18 FC |
| 4,070,551 | 1/1978 | Weir .................................. | 179/15 AT |
| 4,112,260 | 9/1978 | Kurokawa et al. ............ | 179 18 FC/ |
| 4,119,805 | 10/1978 | Pratelli ............................. | 179/18 ES |

*Primary Examiner*—Thomas A. Robinson
*Attorney, Agent, or Firm*—Joel I. Rosenblatt

[57] ABSTRACT

A telephone switching system comprising a central office switching unit and a remote field switching unit controlled by the central office unit. The field unit provides controlled connections between a number of trunks extending from the central office unit and a greater number of subscribers connected to the field unit. The field unit additionally contains a number of intracall lines for establishing a connection between two subscribers without the need for sustained trunk connection after the call is established. The central office unit includes a system controller comprising a microprocessor and associated memory units. The system controller receives information interrupts from both the central office unit and the remote field unit as to subscriber calls, subscriber identity, trunk availability and overall system condition alarms. Appropriate control signals are sent from the central office unit to the remote unit to establish the appropriate connections between the units for subscriber connections. Control and data words and interrupts travel between the central office unit and the remote field unit over a voice grade, duplex data channel. Control and data words are in binary and serial encoded on PSK carriers transmitted through the data channel. Each unit transmits a distinct carrier, and each unit contains a filter network to separate the incoming and outgoing carriers. The control and data words include parity lists and error correction bits for correction of errors in the transmitted words by the system controller. A phase lock loop in each unit demodulates the carrier to remove the serial words.

38 Claims, 14 Drawing Figures

| $V_3$ | $V_2$ | $V_1$ | $V_0$ | BIT POSITION | BIT NAME |
|---|---|---|---|---|---|
| 0 | 0 | 0 | 0 | — | — |
| 0 | 0 | 0 | 1 | 1 | $H_0$ |
| 0 | 0 | 1 | 0 | 2 | $H_1$ |
| 0 | 0 | 1 | 1 | 3 | $Q_0$ |
| 0 | 1 | 0 | 0 | 4 | $H_2$ |
| 0 | 1 | 0 | 1 | 5 | $Q_1$ |
| 0 | 1 | 1 | 0 | 6 | $Q_2$ |
| 0 | 1 | 1 | 1 | 7 | $Q_3$ |
| 1 | 0 | 0 | 0 | 8 | $H_3$ |
| 1 | 0 | 0 | 1 | 9 | $Q_4$ |
| 1 | 0 | 1 | 0 | 10 | $Q_5$ |
| 1 | 0 | 1 | 1 | 11 | $Q_6$ |
| 1 | 1 | 0 | 0 | 12 | $Q_7$ |
| 1 | 1 | 0 | 1 | 13 | MAJOR ERROR |
| 1 | 1 | 1 | 0 | 14 | MAJOR ERROR |
| 1 | 1 | 1 | 1 | 15 | MAJOR ERROR |

Fig. 13

LINE CONCENTRATOR

BACKGROUND OF THE INVENTION

This invention relates to telephone switching equipment and, in particular, to line concentrators, which provide telephone connections between the system central office unit and a number of subscribers over a lesser number of trunk lines extending from the central office unit.

Line concentrator technology evolved first in the 1960's. In general terms, a concentrator incorporates a central office unit located in the main telephone switching central office, which, in effect, replaces the normal direct subscriber connections. There is no identifiable difference between the concentrator and subscribers to the central office system, however. The central office unit provides an interface between the overall system and the subscribers and, in essence, is a second order switching unit for establishing appropriate line connections between the central office and the subscribers.

Voice connection between the central office unit is established through a plurality of trunks which extend to a remote switching unit to which a greater number of subscribers are connected. Connections between the subscribers and the control office thus are "concentrated" in the lesser number of trunks.

A feature of the concentrator is that as additional subscribers are added to the system, additional trunks are not necessarily needed, thus lowering installation costs. The line concentrator therefore is particularly adaptable to areas of increasing population growth, such as housing developments.

Since the fundamental purpose of a line concentrator is to concentrate traffic in a small number of trunks, effective utilization is predicated upon a statistical analysis and the resulting assumptions that only a certain number of subscribers will have need for a telephone service at any particular instant in time. It naturally follows that since each subscriber does not have a trunk necessarily allocated to him, the possibility, albeit remote, for a system overload is ever present.

An innovation to line concentrator technology, to minimize the overload problem, is the inclusion of intracall capability. This envisions a line concentrator system, as outlined, but wherein connections are made in the remote field unit between called and calling subscriber so that there is no need to maintain the connection between the two subscribers over the two trunks otherwise needed, thereby freeing these trunks for incoming and outgoing calls and thus increasing the overall traffic handling capability of the system. Thus, in essence, a line concentrator system with intracall capability uses the trunk lines for establishing the initial connection between the called and calling subscriber as well as for connections to the subscribers from the central office for outgoing calls, while the intracall lines are used to maintain the call between the subscribers. A leading patent in this area is U.S. Pat. No. 3,099,717.

SUMMARY OF THE INVENTION

In accordance with the present invention, the basic, fundamental building blocks of a line concentrator are maintained in that there is a central office unit located in the telephone system central office which is connected to a remote field unit over a number of trunk lines extending from the central office unit. The number of trunk lines is substantially less than the number of subscribers connected to the remote unit. In addition, the remote field unit contains a plurality of intracall lines for establishing the intracall connection between the subscribers connected to it should that be necessary. The central office contains busy out connections so that the system will busy out the office subscriber lines to the central office unit in a conventional manner for producing a busy signal to a caller of a subscriber who is off hook.

In contrast with the prior art, however, an intracall connection is determined not by scanning the trunks, but through a system controller containing a microprocessor and associated memory unit. When a subscriber goes off hook to make a call, the system controller identifies the particular subscriber and when the subscriber dials the calling number, the system controller determines, from its memory unit, if the called number is another concentrator subscriber. The call is first conventionally established over two trunk lines, but after the above correlation is made, the appropriate connections are made in the remote field unit, under the control of system controller, for establishing the intracall.

Communication between the remote field unit and central office unit takes place in a voice grade, duplex data channel. Information flows in this channel in serial, binary form on phase-shift space keyed (PSK) carriers. Information from the central office appears on a particular carrier frequency, 1250 Hz., while data from the remote field unit is carried on a carrier of 2500 Hz. In each instance, the phase is shifted to encode a binary "1" or "0". The carriers are demodulated in each unit to remove the data, coverted from serial into parallel data and appropriately decoded.

A band pass filter in front of the demodulator in each unit separates that unit's transmitted carrier from the carrier received from the other unit so as to prevent interference between transmitted and received data.

Transmitted data includes parity coding in the form of an additional bit representing whether the overall number of binary "1"'s in the word is odd or even. In addition, an error correction code of four additional bits is provided, with each bit representing parity within certain smaller portions of the basic eight bit data word and the remaining error correction bits. The error correction code is decoded in the receiving unit for identifying one erroneous bit in the actual transmitted sixteen bit word. Identification of an erroneous bit is corrected by reversing its level.

Two identical eight bit half-words are transmitted from the remote over the data channel to the central office for subscriber off hook interrupts. The system controller compares the two half-words for error determination and correction. Data from the central office unit, however, comprises a single sixteen bit word. Remote unit relay control data from the central office unit is echoed back to the central office unit through the data channel from a transponder located in the field unit for additional error correction.

Both units contain a parallel to serial data convertor for generation of serial data to drive a PSK modulator for producing the PSK carrier associated with each unit.

Each unit contains a phase-lock loop phase detector, which receives the carrier through the aforementioned band pass filter. The detector output is supplied to a serial to parallel convertor for utilization. Error determination and correction through the parity and error correction codes takes place in the serial to parallel convertors.

Thus, an object of the present invention is to provide a line concentrator system, containing intracall capability wherein data is transmitted between the remote and central office units through a single data channel by means of phase shift keyed signals.

Another object of the present invention is to provide for a line concentrator system having intracall capability wherein the determination that a called and calling subscriber are connected to the same field unit is accomplished without trunk scanning.

These and other objects of the present invention will be apparent, and obvious, to one skilled in the art from the following drawing, detailed description and claims.

DESCRIPTION OF THE DRAWING

FIG. 13 is a table setting forth the error correction code and corresponding vectors contained in a data word transmitted between the central office unit and field unit for system control.

DETAILED DESCRIPTION

Figure 1:
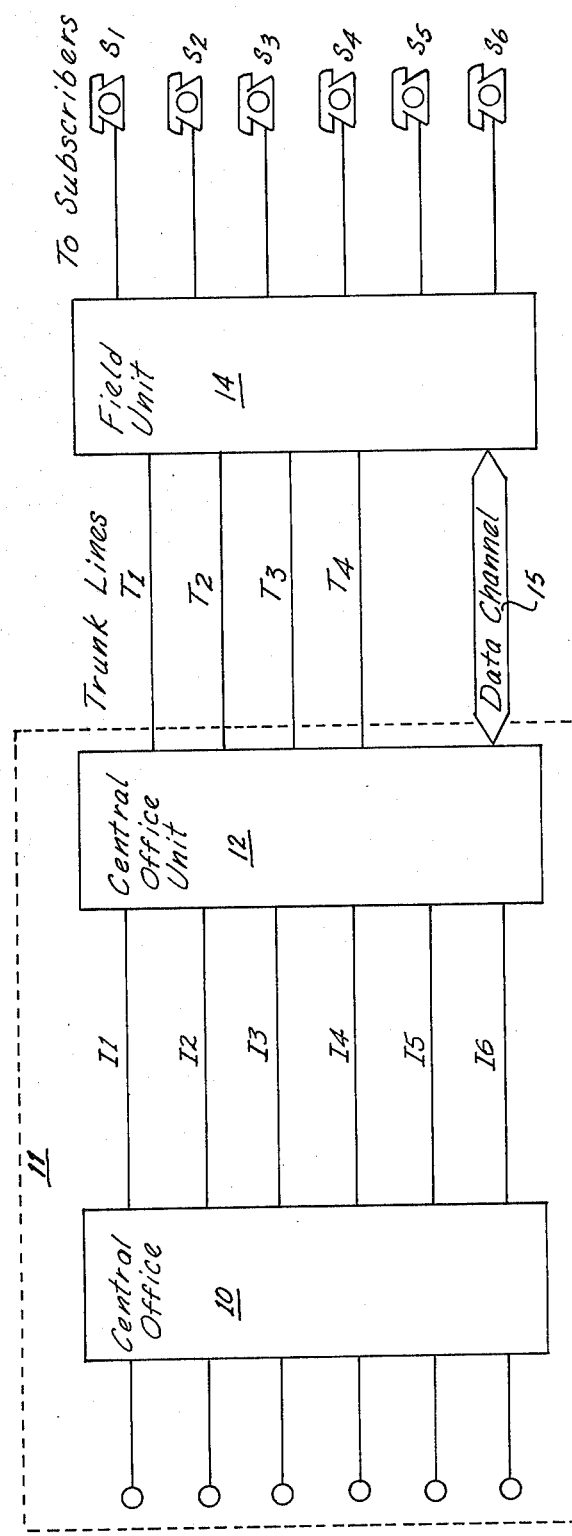
FIG. 1 is a block diagram of an overall line concentrator system.

FIG. 1 is an overall depiction of a telephone switching system utilizing a line concentrator. The unit designated central office equipment 10 is the normal, preexisting equipment in the overall telephone switching system central office 11 located at a considerable distance from the subscribers S1-S6. As shown, a plurality of lines extends into the central office equipment 10 and extending from the equipment is an equal plurality of lines I1-I6. In the absence of a line concentrator system, lines I1-I6 are connected to the subscribers S1-S6 through an equal number of trunk lines. However, in the depiction of FIG. 1, an additional unit, the central office unit 12 is located in the system central office 11 and connects to lines I1-I6. In place of lines I1-I6 a lesser plurality of trunk lines T1-T4 extends from the central office unit 12 to a field unit 14 at a remote location, to which the subscribers S1-S6 are connected. It is important to realize that to the central office equipment 10 there is no discernible difference when the central office unit 12 is connected to lines I1-I6 as opposed to a direct connection to subscribers S1-S6.

From the depiction in FIG. 1, it can be observed that by the inclusion of the line concentrator system consisting of the central office unit 12 and field unit 14, traffic to the subscribers S1-S6 is through lines I1-I6 and concentrated through the lesser plurality of trunk lines T1-T4.

The data channel 15 that is shown provides a communications path for information and control instructions between the central office unit 12 and field unit 14. As outlined in greater detail below, the central office unit 12 contains a system controller 16 characterized by a microprocessor and its associated memory units to receive data from the field unit 14 as to overall system condition and subscriber demand in the form of interrupts and transmit appropriate control instructions through the data channel 15 to the field unit for establishing the appropriate connections to subscribers S1-S6 and trunk lines T1-T4. Additional switching functions are carried out in the central office unit 12, also under the control of the system controller.

The field unit 14 contains a plurality of intracall lines, which although not shown in FIG. 1, are disclosed below. These lines provide a connection path between subscribers S1-S6, thereby freeing at least two trunk lines T1-T4 for use in incoming and outgoing calls.

It is important to note that the actual number of trunk lines T1-T4, subscriber units S1-S6, central office lines I1-I6, is not important beyond illustrating that the line concentrator establishes incoming call connections through a lesser number of trunk lines than there are subscriber units and central office corresponding subscriber lines.

Figure 2:
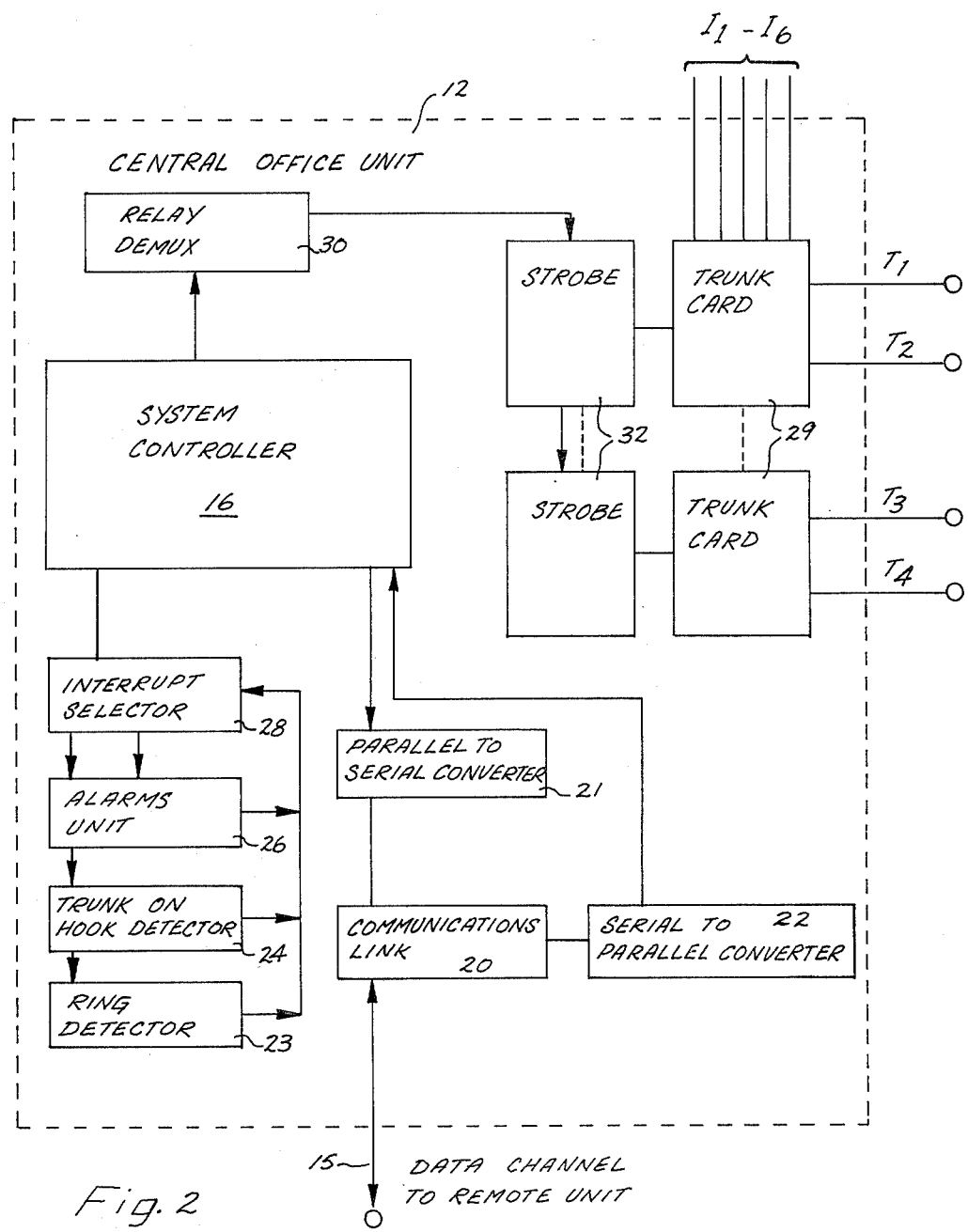
FIG. 2 is a block diagram of the central office unit shown in FIG. 1.
Figure 3:
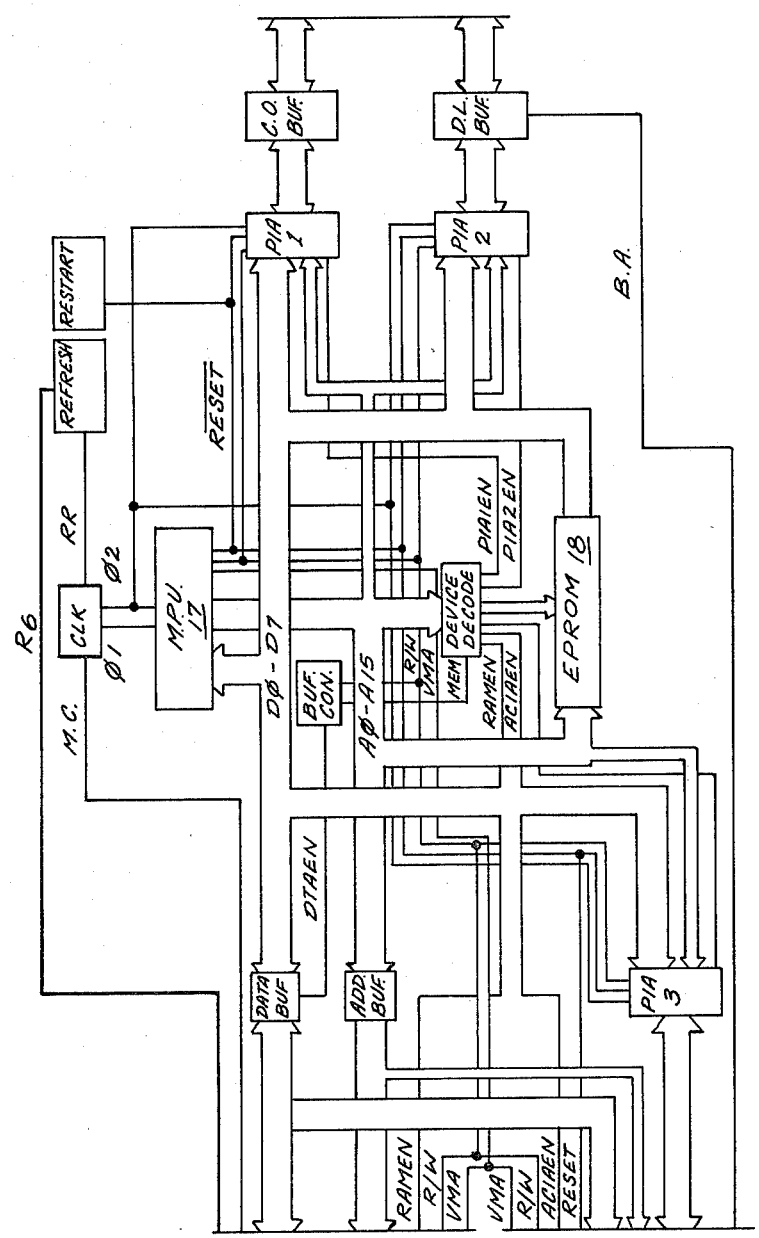
FIGS. 3 and 4 are block diagrams of the system controller contained in the central office unit.
Figure 4:
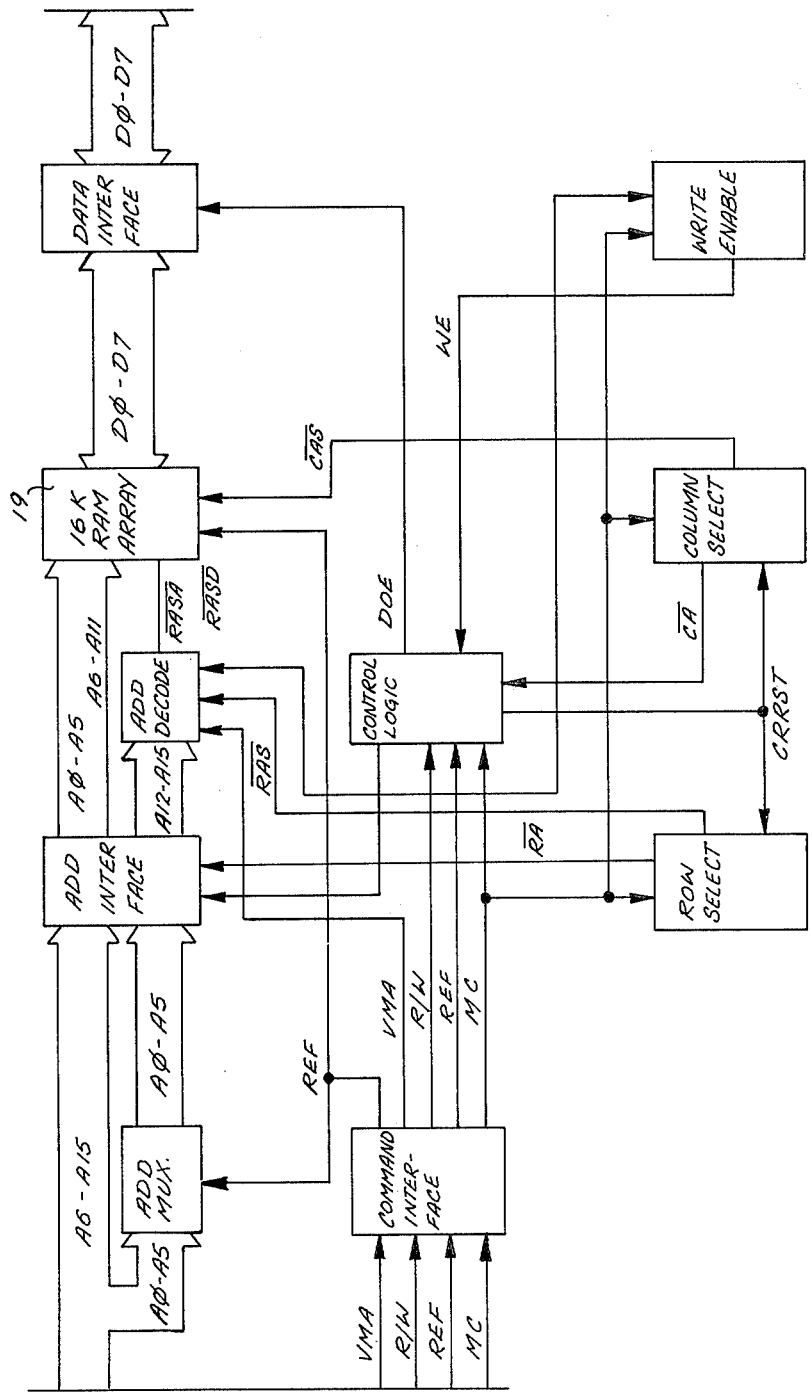

FIG. 2 depicts the central office unit 12 in block diagram form. The system controller 16 as mentioned previously controls all operations of the line concentrator system, and is shown in FIGS. 3 and 4. As shown a microprocessor 17 is employed together with an EPROM 18 and a RAM 19. The EPROM is programmed to carry out the overall system operation and the dynamic RAM provides the dynamic memory for the system and also a register of the phone numbers or identities of each subscriber connected to the field unit 14. Operation of the microprocessor is achieved through conventional, commonly known techniques, which therefore will not be explored in detail hereinafter.

The system controller 16 receives information from the field unit 14 through the data channel 15. This information, in serial binary, comes through the communications link 20 in the form of PSK carrier and is converted back into parallel form for use by the system controller in the serial to parallel convertor 22. Outgoing data to the data channel is converted to serial form by the parallel to serial converter 21.

Information and data relating to incoming calls in the central office unit 12 originating in the central office equipment 10 are generated by the four units: ring detector 23, trunk on hook detector 24, alarms unit 26, and interrupt selector 28. In other words, these four units 23, 24, 26 & 28 provide parallel data to the system controller 16 as to conditions and call demands in the system central office 10. In contrast, data to and from the field unit 14 flows in the data channel 15 in the manner previously outlined.

The central office unit 12 contains trunk switching cards 29, to which the central office lines I1-I6 and the trunk lines T1-T4 are connected, as shown. Control instructions from the system controller 16 for establishing appropriate connections in the central office unit 12 between the lines I1-I6 and trunks T1-T4 pass through the relay demultiplexer 30 (demux) to a strobe unit 32. The trunk cards 29 contain relay switching circuits, and the decoded information from the demux unit 30 is used to address the appropriate relay drives through the strobe cards 32—FIG. 2 to bring about the desired connection between the trunk lines and central office lines.

Figure 5:
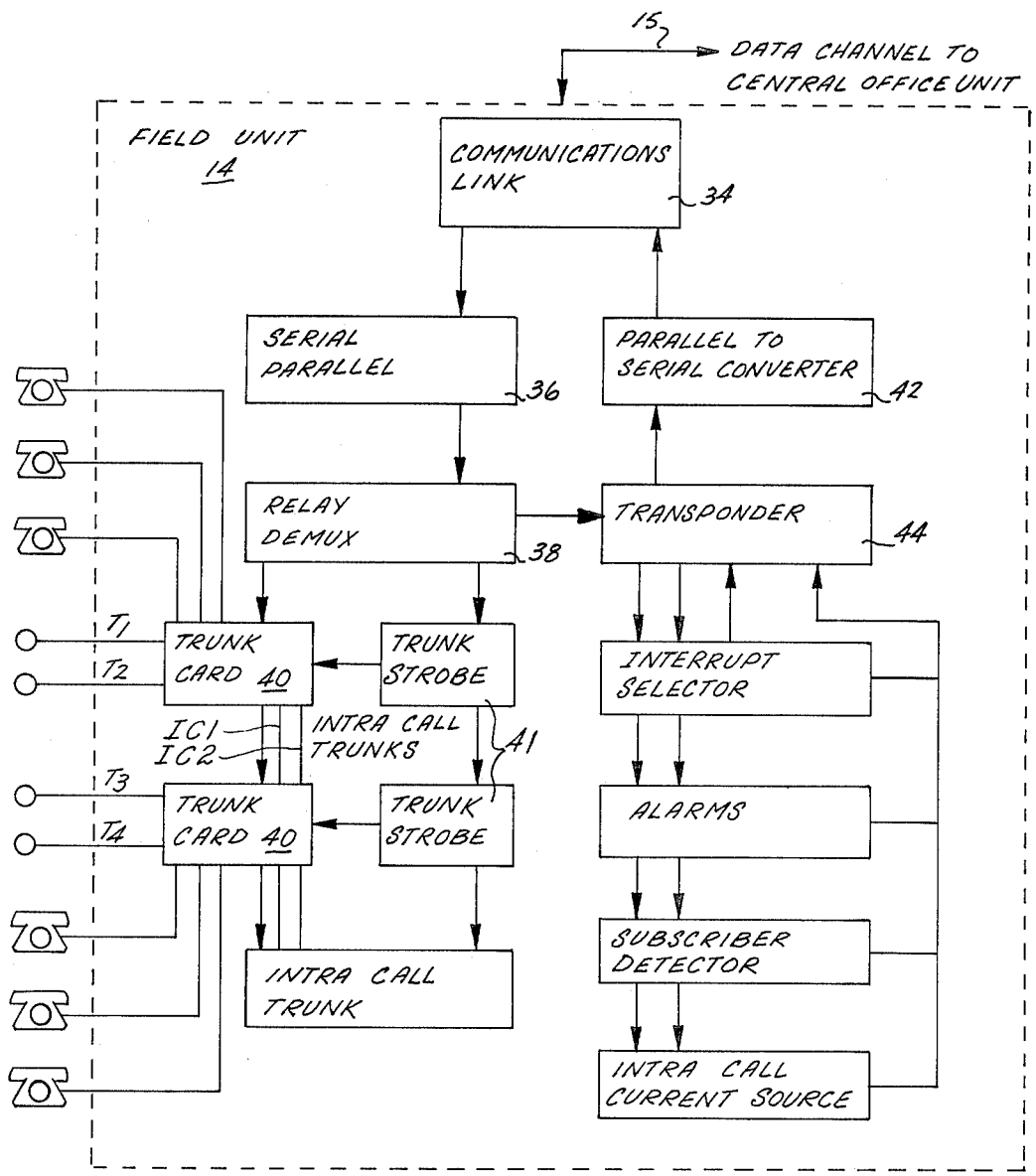
FIG. 5 is a block diagram of the field unit shown in FIG. 1.

FIG. 5 depicts the field unit 14 in a block diagram format. Data is received from and transmitted to the central office unit 12 in the data channel 15 through the field unit's communications link 34. Incoming data from the central office unit is converted from serial to parallel form in the serial to parallel convertor 36. The parallel data is then sent to a relay demultiplexer 38, which decodes the parallel data for appropriate addressing to the trunk card 40 through the trunk card strobe unit 41.

The trunk cards, as shown, are connected to the trunk lines T1-T4 and likewise to the subscribers S1-S6. In addition, three intracall trunks are connected between the trunk cards. For purposes of example only, two intracall trunk lines IC1 and IC2 are shown. As mentioned previously, when two subscribers are in telephone connection, the system ultimately establishes the connection entirely within the field unit through one of the intracall lines IC1, IC2.

Information from the field unit 14 relating to subscriber usage, subscriber identity and overall field unit condition, in the form of alarms is transmitted to the central office unit 12 through a parallel to serial convertor 42.

The transponder 44 shown in FIG. 5 is used for error correction of the data transmitted from the central office unit for control of the trunk cards 40. It operates by taking the converted data in the relay demux unit 38 and sending it back through the parallel to serial convertor 42 to the central office unit 12, where the system controller 16 determines if any error was present in the data received at the field unit 14. The precise method for error correction utilized in the line concentrator of the present invention is described in greater detail in the latter portion of this description.

Figure 6:
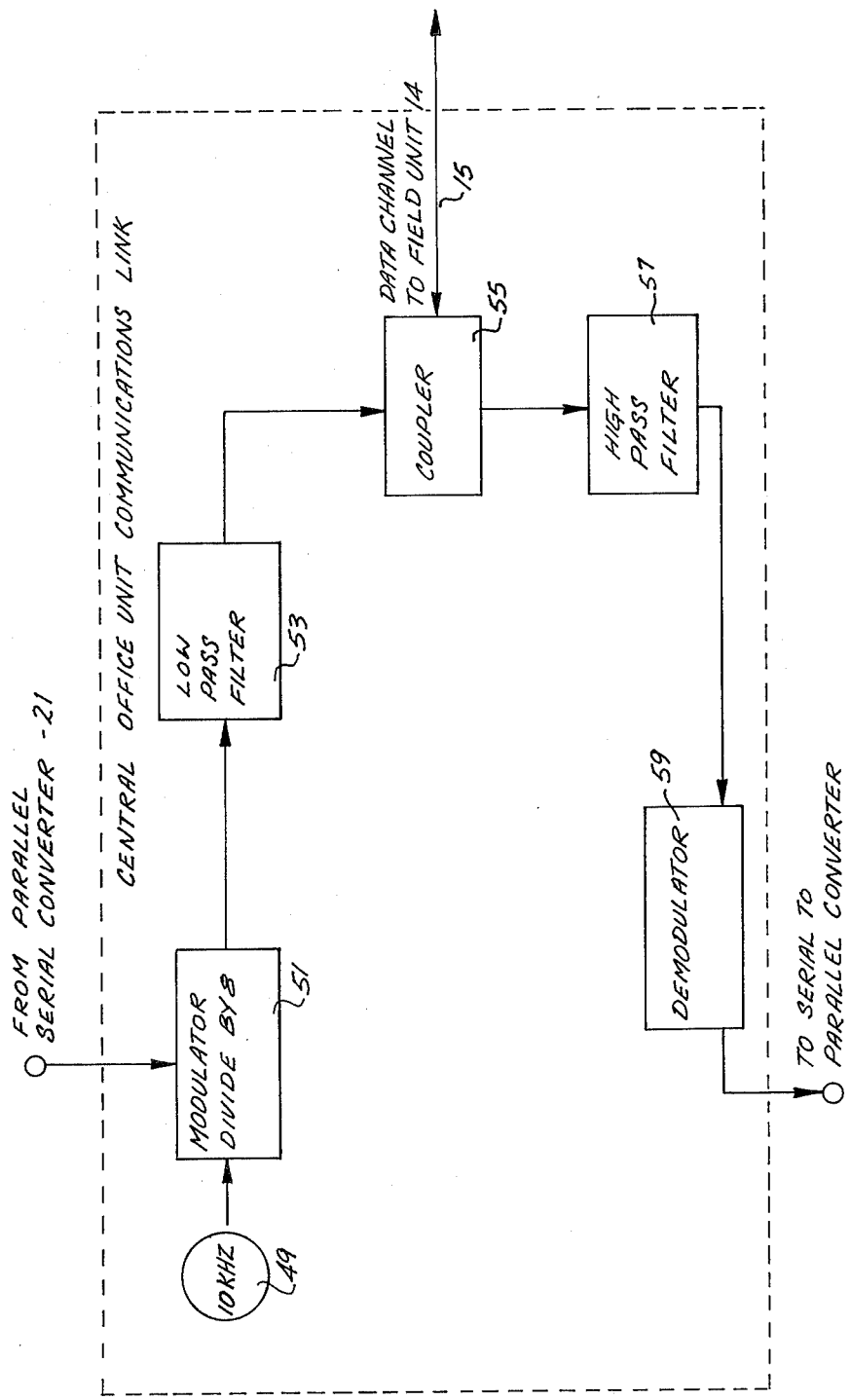
FIG. 6 is a block diagram of the central office unit communications link.

FIG. 6 is a depiction of the central office communication or com. link 20. The com. link includes a 10 Khz oscillator 49, the output of which is supplied to a modulator 51. The modulator, in a manner outlined below, divides the output by eight to produce a 1250 Hz signal which is supplied through a low-pass filter 53 to a bidirectional coupler 55, which is ostensibly a transformer for coupling of AC signals to the balanced duplex transmission line comprising the data channel 15.

In addition to producing the 1250 Hz carrier, the modulator receives binary data from the parallel to serial convertor which modulates the 1250 Hz signal by phase shift keying, so that, a binary "0", for example, corresponds to a phase lead and a binary "1" corresponds to a phase lag.

In the latter portion of this description, it will be seen that data from the field unit 14 is sent to the central office unit 12 in a similar manner, but on a carrier of 2500 Hz. This data is likewise carried in the data channel 15 to coupler 55. It is passed by the high pass filter 57 to a demodulator 59, which produces a binary output that is supplied to the serial to parallel convertor 21. In this way, proper separation between the incoming and outgoing carrier is achieved for signal interference avoidance. In addition, the high pass filter 57 also blocks transmission of the output from the central office modulator 51 to its own demodulator 59.

Figure 7:
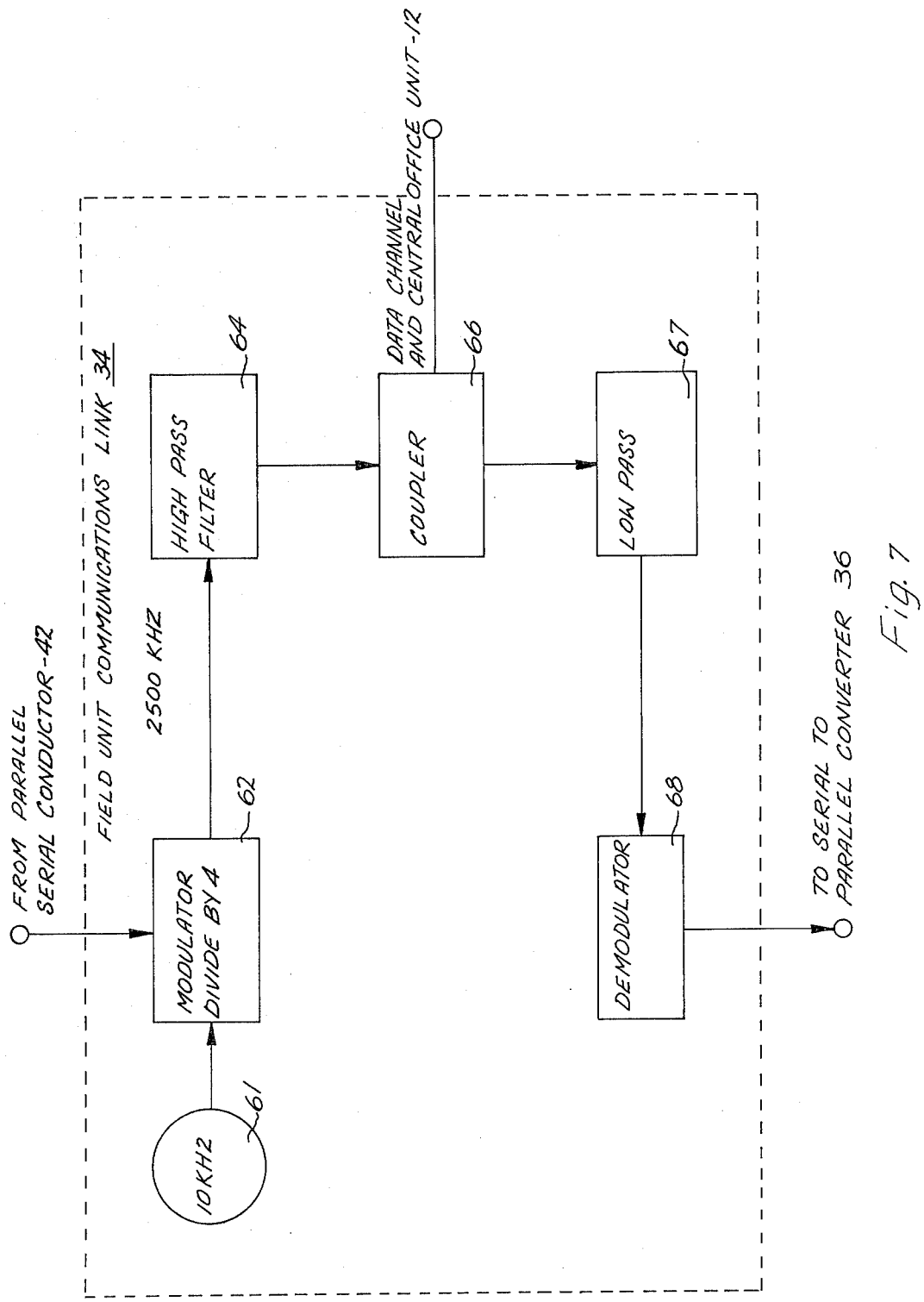
FIG. 7 is a block diagram of the field unit communications link.

The operation of field unit com. link shown in FIG. 7 is virtually the same. Once again a 10 Khz oscillator 61 is provided, with its output which is fed into a modulator 62, which now divides the 10 Hz signal by four instead of eight, as with the central office unit previously described. The field unit parallel to serial convertor 42 supplies the serial data to the modulator where it phase shift keys the 2500 Hz carrier. The carrier is passed through a high pass filter 64 to the coupler 66 for transmission down the duplex data channel 15. The low pass filter 67 receives data on the 1250 Hz carrier from the central office unit 12 while it blocks the 2500 Hz carrier from modulator 62. The output from low pass filter 67 that is the carrier information from the central office unit 12 is sent to the demodulator 68 where the PSK information on the incoming carrier is removed and supplied to the parallel to serial convertor.

Figure 8:
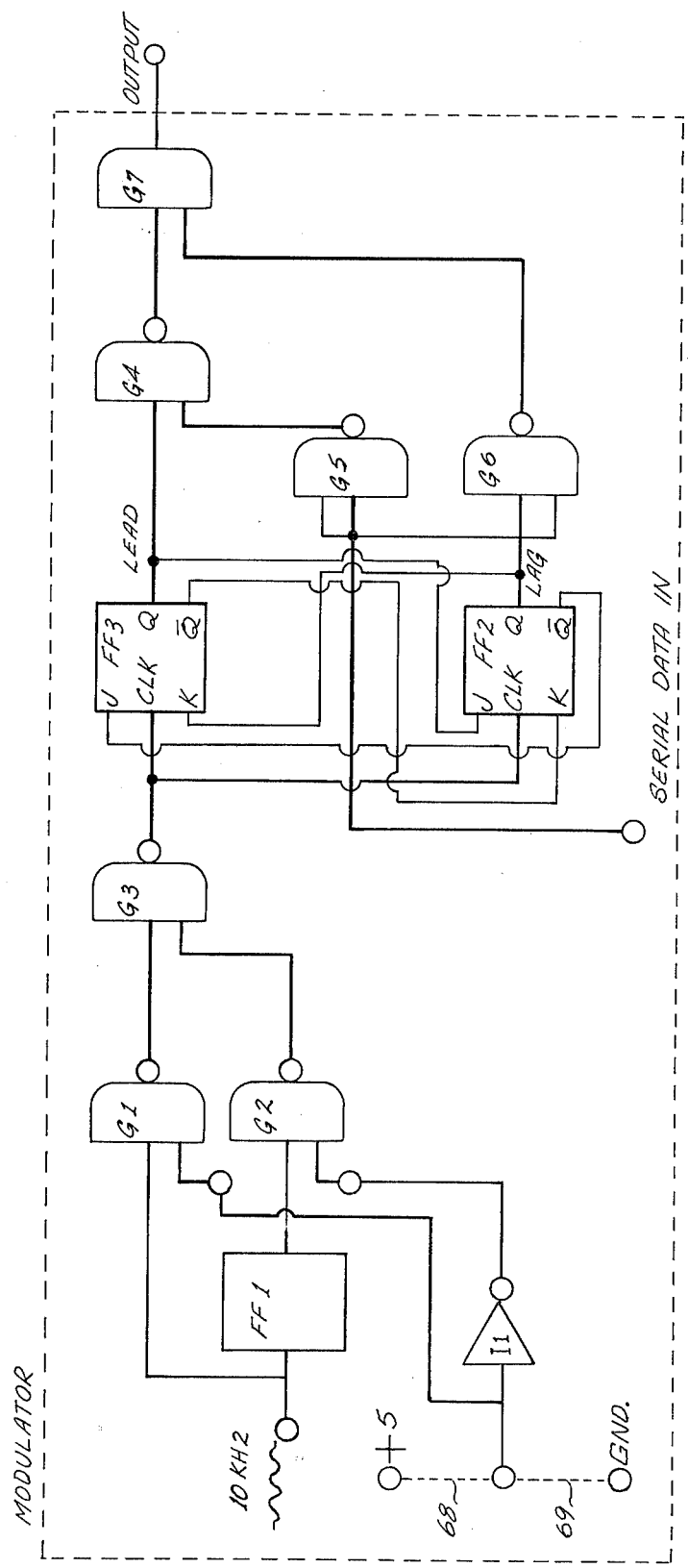
FIG. 8 is a block diagram of the modulator employed in the communications link in both the central office unit and field unit.

FIG. 8 shows the modulator used in both the central office unit and field unit com. links. Depending on which unit is used, the modulator includes appropriate interconnections 68, 69 for producing the required carrier output, which again, in the case of the central office is 1250 Hz and in the case of the field unit is 2500 Hz.

With reference to FIG. 8, the 10 Khz signal is divided by two by the flip flop FF1. If I1 inverter input is connected to +5 volts by line 68, 10 Khz is passed through G1, G3 to FF2, FF3. If I1 inverter input is connected to ground by line 69, 5 Khz signal is passed to FF2, FF3. 5 Khz signal is used at the central office and while 10 Khz signal is used at the field unit. In each application, the signal from G3 is supplied to the inputs to two flip flops FF2 and FF3, which, as shown, form a quadrature divider. As a result, the output at the Q terminal of FF1 and FF2 is one-fourth the output of 63. Thus, in the central office, the output is 1250 Hz, and in the field unit, the output is 2500 Hz.

The Q outputs on FF2 and FF3 are 90° out of phase, as a result of the shown circuit connection, with the output of FF3 leading the output of FF2, as denoted in FIG. 8.

Figure 9:
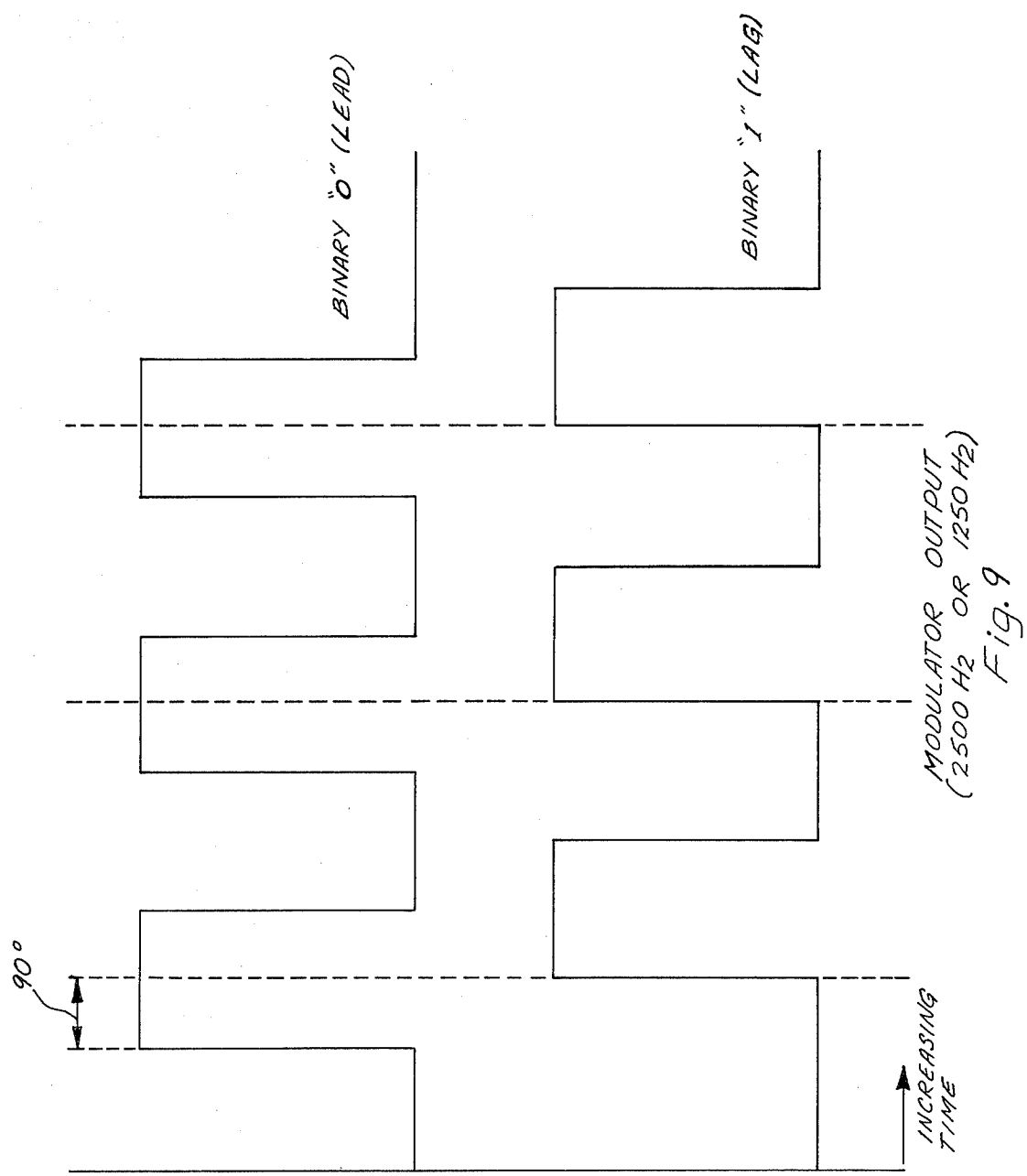
FIG. 9 is a plot of the phase modulated output from the modulator.

Serial data is supplied to a gate G5, which, together with gates G4, G6 and G7 switches the output of gate G7, between the outputs of FF2 and FF3 depending upon whether the serial data is a binary "1" or "0". The resulting wave form is shown in FIG. 9.

Figure 10:
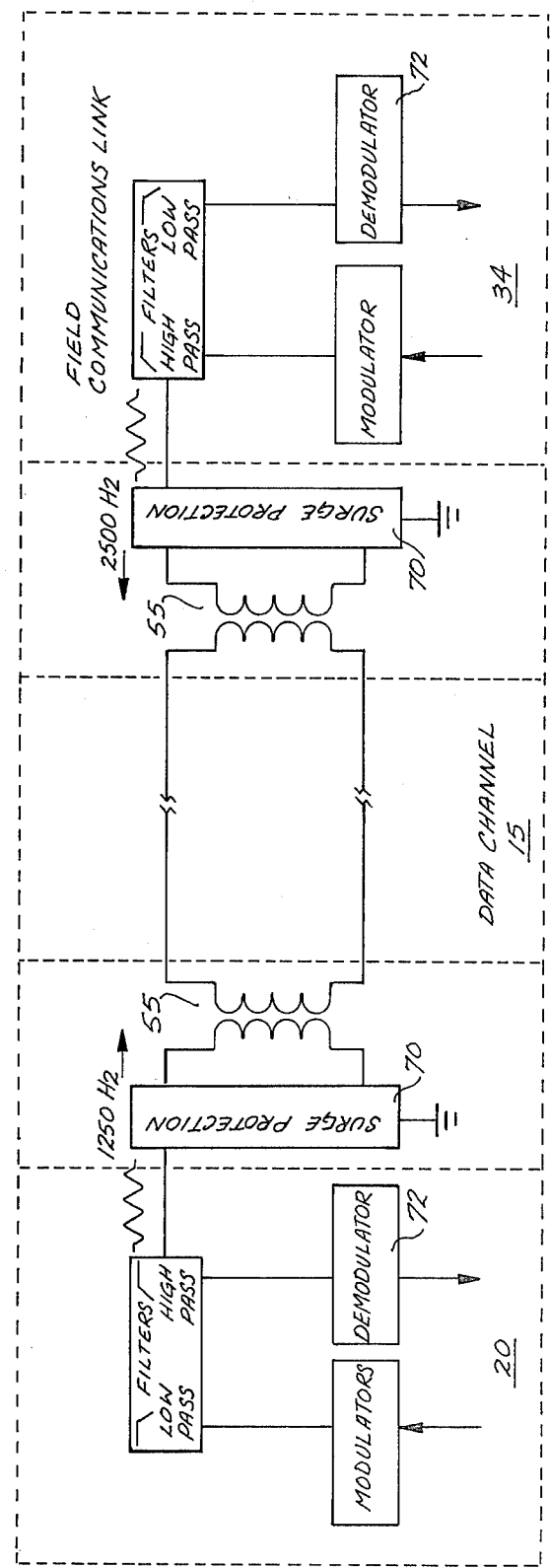
FIG. 10 is a block diagram depicting the data channel and communications links in the central office unit and field unit.

FIG. 10 is a composite depiction of the data channel 15 and the central office 20 and field unit com. links 34. The surge protection blocks 70 prevent damage from environmentally generated spike voltages on the data channel 15. Once again, it can be seen that the data channel is balanced duplex, being coupled to each com. link 20, 34 through a transformer 55.

As depicted, data flows from the central office on a 1250 Hz carrier to the field unit while data flows from the field unit on a 2500 Hz carrier. Incoming and outgoing data are properly separated by means of low pass and high pass filters in each unit. Each com. link 20, 34 contains a demodulator 72 for detecting the PSK carrier to produce the required binary information encoded thereon.

The demodulators 72 are not shown in greater detail in the drawing for the reason that they are essentially an off the shelf phase lock loop detector, quite widely known and easily understood for use in detection of PSK signals. A further analysis of the demodulators thus is not needed.

Figure 11:
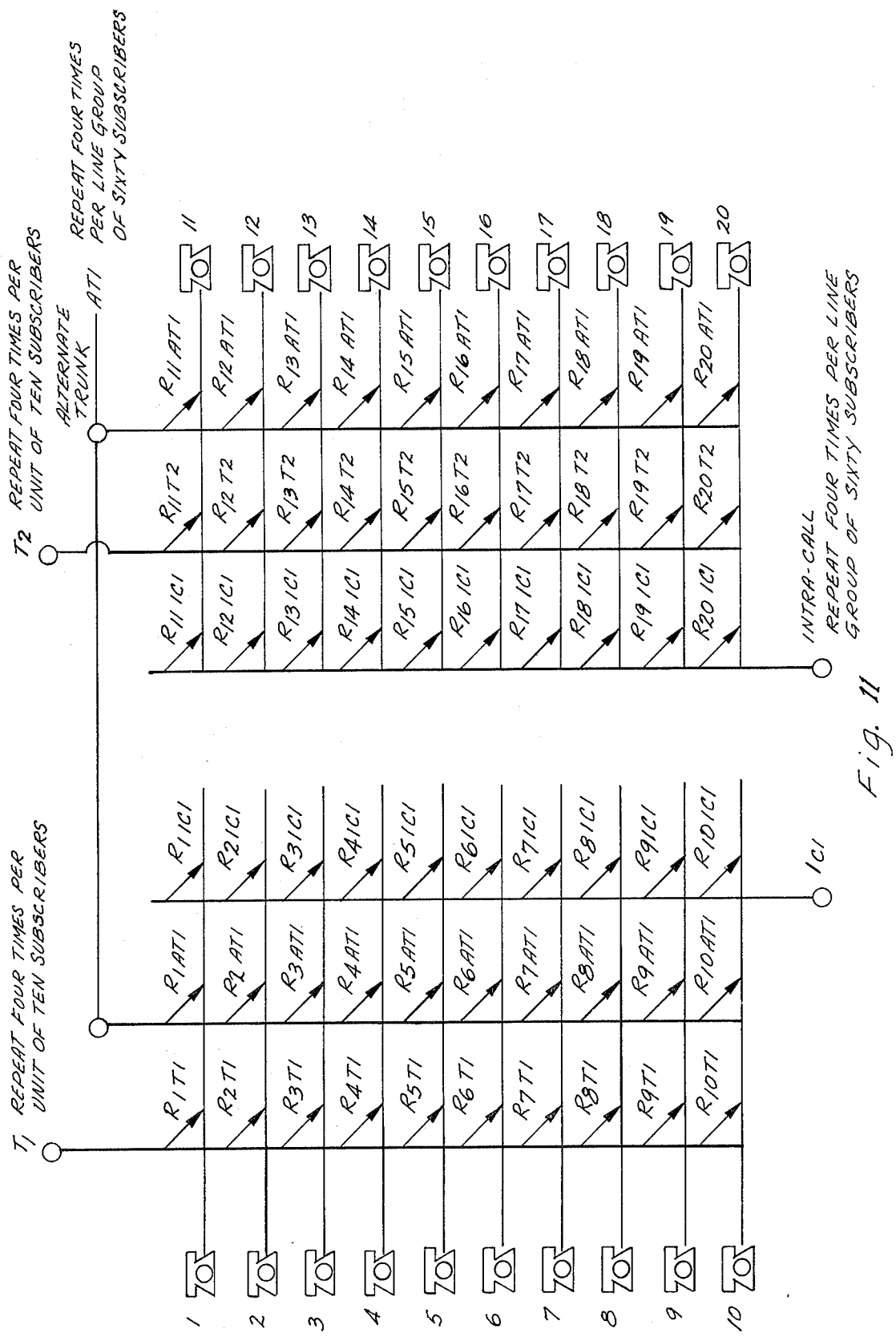
FIG. 11 is a depiction of two subscriber switch cards located in the remote field unit serviced by four trunk lines and two intracall lines showing the corresponding relay contacts for each subscriber.

FIG. 11 depicts the connections between the subscribers and the trunk lines T1-T2 and intracall line IC1. Appropriate connections are provided by a relay at the cross point between each trunk line and a subscriber line. Each 10 subscribers has access to four primary trunks. For example T1 in the case of subscribers 1–10 and T2 in the case of subscribers 11–20. Each 10 subscribers in a 60 subscriber line group has four intracall lines allocated to it. Thus subscribers 1–20 have access to intracall line IC1. In a conventional and well-known manner, connections between a subscriber and its appropriate trunk is achieved by actuation of the proper relays at the cross points. The relay designation shown in FIG. 11, i.e. R1T1 corresponds to the subscriber number and the trunk line or intracall line associated with it. Thus R1T1 corresponds to the relay for subscriber 1 to trunk 1. R10 alternate trunk AT1 corresponds to the relay for subscriber 10 to alternate trunk AT1.

Figure 12:
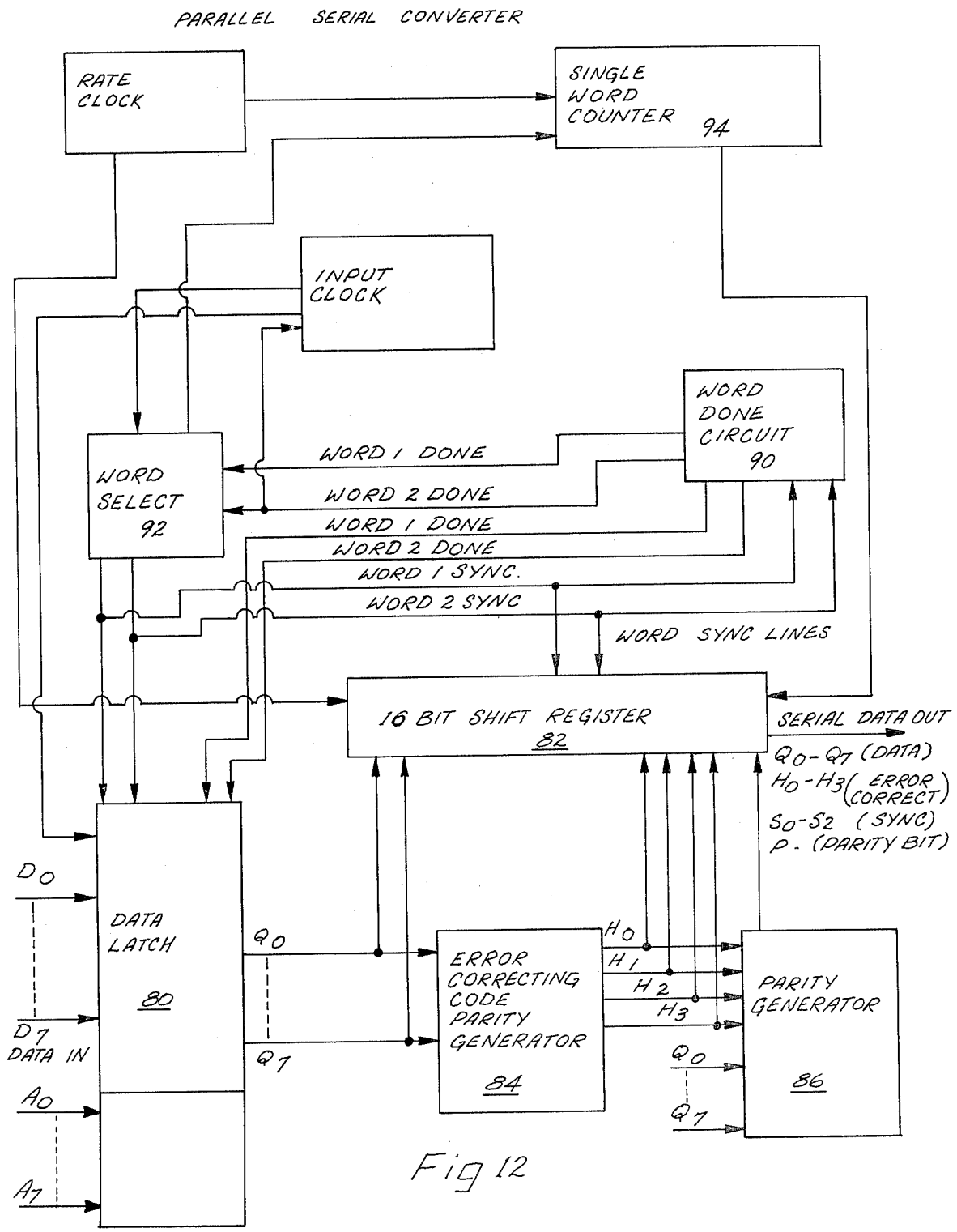
FIG. 12 is a block diagram of the parallel to serial convertor utilized in the central office unit and field unit.

FIG. 12 is a block diagram of the parallel to serial convertor employed in both the central office and field units. First it should be noted that the basic parallel data consists of two eight bit words D0-D7 and A0-A7, which are supplied from the interrupts units, alarm units or microprocessor. Data is clocked through a data latch 80 and one word is selected producing the data outputs Q0-Q7. As shown, these outputs are supplied to a sixteen bit shift register 82 and also to an error correcting code parity generator 84. This parity generator 84 provides an additional four bits H0-H3 to shift register 82. These four bits H0-H3 are also supplied, together with Q0-Q7 to the parity generator 86, which produces an additional parity bit P in the shift register 82. Data loading occurs at the rate of 625 baud as determined by the rate clock.

The word DONE circuit 90 maintains a running register for the words bits loaded into shift register 82. In the field unit, data pertaining to subscriber off hook conditions demanding service are loaded into shift register 82 with D0-D7 equal to A0-A7 so that two identical serial data words are produced. The word DONE circuit 92, as shown, maintains a register to determine when the second word is completed thereby allowing the entry of additional new data into data latch 80 and appropriate signals are sent over the WORD 1 and WORD 2 DONE lines for reloading Q0-Q7 into register 82 after the first word is loaded. The WORD 1 and WORD 2 sync lines provide proper synchronization between the loading of the data D0-D7 into latch 80 and the command from the word DONE circuit 90. The single word counter 94 together with the rate data allows transfer of the serial data from register 82 after the register is fully loaded.

The word select circuit also causes register 82 to add three additional bits to the serial word. These three additional bits consist of one bit at the beginning of the word and two at the end and function to provide proper separation between the data words transmitted down the data channel. A complete data word thus is sixteen bits, and in the case of subscriber off hook interrupts is transmitted twice.

The reason for transmitting two words in this manner is that when the interrupt data is received in the central office unit, the system controller will compare the two words—determine if a error has occurred in transmission. On the other hand, due to the inclusion of the previously mentioned transponder in the field unit by which the data from the central office units echoed back to the central office, the need for the two word transmission is not necessary, for the same effect is essentially produced.

Data transmission consists of a sequential number of data bits transmitted from the shift register 82 in the manner just described. The parity generation consists of basing its parity bit P upon whether the number of ones is odd or even in the word comprising Q0-Q7 and H0-H3. If the number is odd, then the added parity bit P is set at one. But if the number of data bits is even, then the added parity bit P is set at zero. A check for the correctness of the transmission is obtained by generating parity again on the received data and comparing this parity to the transmitted parity value. Thus, if data is transmitted in even parity and received as odd parity, then an error has been detected, although its precise location extent is not known. Moreover, if two errors occur, original parity results due to a parity reversal and therefore an error will not be detected.

An error correcting parity code is provided in the form of bits H0-H3. These, in effect, define parity within smaller units of the entire data word which is transmitted—Q0-Q7, H0-H3. The H0-H3 bits are checked against this sub-parity of the received word. This takes place in the serial to parallel convertors described below, which contain groups of exclusive OR's to generate a four bit vector, indicating an incorrect bit.

The error correcting parity bits H0-H3 are placed in positions 1, 2, 4 and 8 in the transmitted word. This is so that one parity bit does not effect another parity bit. The error correction code from the four parity bits H0-H3, produces four vectors V0, V1, V2 and V3, in the serial-parallel convertors, as mentioned, the vector arrangement shown in the table of FIG. 13.

It should be noted that V0 will be one only if there is an error in H0, Q0, Q1, Q3, Q4 or Q6, and, consequently, H0 is simply the parity value for Q0, Q1, Q3, Q4, Q6, and V0 is a parity of the same word plus the H0 bit. Similarly, V1 will be only one if there is an error and H1, Q0, Q3, Q5 or Q6 and so H1 is the parity bit for Q0, Q2, Q3, Q5 and Q6. V2 will be one only if there is an error in H2, Q1, Q2, Q3 or Q7 and so H2 is the parity bit for Q1, Q2, Q3 and Q7. Finally, V3 will be only one if there is an error in H3, Q4, Q5, Q6 or Q7 and so H3 is the parity bit for Q4, Q5, Q6 and Q7. The vectors V0, V1, V2 and V3 therefore indicate parity for the subgroups previously defined.

Actual error correction takes place in the serial to parallel convertor shown in FIG. 14 and discussed in greater detail below. Again, it should be noted that the four bit error vector word H0-H3 identifies the bit in error by generating a four bit number indicating the position of the bit in error. Thus, if the error vector word is 0111, then bit No. 7 is in error and decoded in the serial to parallel convertor locates that bit and inverts it for correction.

Since the word parity value "P" cannot detect an error of more than one bit, and since the error correction vectors V0—V3 cannot correct an error of more than one bit, an error detected by the error correction code, but wherein there is parity in the 13th bit P bit, must mean an error in two bits, which is uncorrectable in the system and therefore considered a major error requiring retransmission of the data.

Partially summarizing the output from the parallel to serial convertor, the output is in serial form and consists of eight data bits Q0–Q7 plus four error correction parity bits H0–H3 plus one word parity bit P, plus three word separation bits therefore producing a sixteen bit word. In the case of data from the remote field unit, two identical words are transmitted, if it pertains to a subscriber interrupt indicating a subscriber off hook condition.

Figure 14:
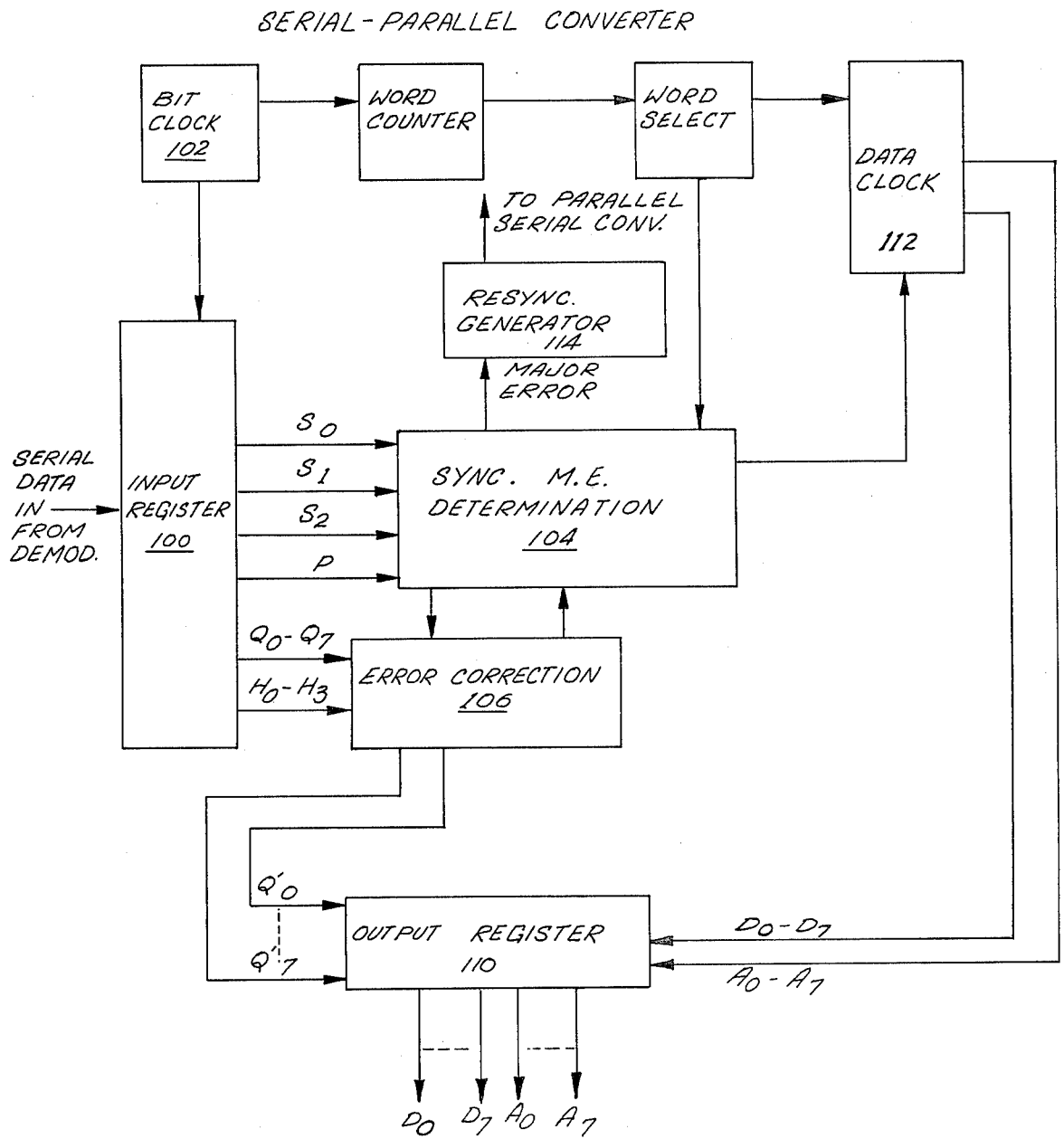
FIG. 14 is a block diagram of the serial to parallel convertor employed in the central office unit and field unit.

Referring now to FIG. 14, the serial to parallel data convertor will be described in greater detail. First it should be again noted that the serial data for the convertor is generated from a phase lock loop which produces a serial binary output in relation to the change in phase of the carrier received in either of the units. This data is supplied to an input register 100. Register 100 stores each of the sixteen bits comprising a single transmitted word. As in the case of the parallel to serial convertor, this occurs under the control of a data clock 102 at the rate of 625 baud. The stored bits in the register 100 are compared in the sync. major error (M.E.) determination unit 104 and the error correction block 106, each consisting of exclusive or circuits (not shown). Unit 104 at the bits inserted at the beginning and end of the transmitted word to determine whether there is proper word synchronization, while data is loaded into register 100, that is, whether any bits have been lost in transmission. In addition, it looks at the overall parity bit P to see if there is parity in the transmitted word excluding the three sync. bits S0, S1 and S2 as defined by the output from error correction unit 106. The error correction unit 106 generates an error correction vector V0–V3 in accordance with the table of FIG. 13.

The error correction circuit 106 tries to correct the incoming serial data Q0–Q7 before loading into register 110. A single bit error incurred during serial data transmission between the terminals can be detected and corrected in unit 106 by inverting the incorrect bit. Thus, the error correction block 106 attempts to invert a single error according to the error correction vectors previously described and shown on the table of FIG. 11. The actual data Q0–Q7 is transmitted to the output register 110 and is clocked through to the outputs producing D0–D7 or A0–A7 upon an output signal from the data clock 112, which outputs only when a major error is not found in unit 104 or a resync generator 114 sends a coded signal to its companion parallel-serial convertor for transmission to the data sending unit, commanding retransmission.

SUMMARY

From the foregoing, it can be seen that in the line concentrator described above in detail, switching, interrupt and alarm data are transmitted between the central office unit and remote field unit over a common data channel. Proper separation between the information on the data channel is accomplished by transmitting the data in digital form on two carriers. Each carrier is transmitted in one unit and received in the other. Data is converted in each unit from parallel form to serial form and transmitted on a PSK carrier. Each carrier, upon receipt, is demodulated and the serial data is converted back into parallel form for use in the receiving unit.

The data words include error correction digital coding by which an incorrect bit in the data word can be corrected in the receiving unit. Interrupts from the remote unit are transmitted to the central office unit in a duplicate word pattern. The central office unit system controller compares the first and second words to determine if an error has occurred in transmission. Data from the central office unit is echoed back to the central office unit for error comparison by the system controller.

The system controller includes a microprocessor and random access memory. The system controller maintains a register of the subscriber numbers connected to the remote field unit. When one subscriber calls another, the system controller establishes the connection through the central office unit in a conventional manner and upon recognizing that the called and calling subscribers are connected to the same remote field unit, the connection is made through an intercall line in the field unit and the earlier connection over the trunk lines is released. Recognition that the called and calling subscribers are connected to the same remote field unit is accomplished in the system controller by storing the identity of the calling subscriber when he goes off hook, storing the identity of the called subscriber when the dialed information is received from the calling subscriber at the time the central office connection is made and comparing these identities with those stored in the system memory. An intracall is thus recognized when the calling subscriber is found to have dialed another subscriber.

Finally, it should be realized that the previously described line concentrator system can be utilized with microwave transmission link-ups between the remote unit and central office unit. In this installation, in addition to voice communications, by means of microwave links, the data would be sent by microwave. Upon receipt, the data would be utilized to encode a PSK carrier for transmission and receipt in the remote or central office unit. Thus, the concentrator system described above, is particularly adaptable to a microwave link-up without major system modifications.

While the foregoing is a description of a preferred embodiment of our invention, no doubt there are numerous possible modifications and variations which can be made to this embodiment but which nonetheless are embraced by the true scope and spirit of our invention. Consequently, the claims set forth below are intended to cover all such modifications and variations.

We claim:
1. A line concentrator, comprising:
   a central office having a central office unit,
   a remote field switching unit separately located from said central office unit and adapted for connection to a plurality of subscribers,
   a lesser plurality of trunk lines connecting said central office and subscribers under control of said central office,
   means for communicating control and information data between said central office unit and remote unit on a common communications channel utilizing a plurality of encoded carriers,
   and wherein said carriers are phase shift modulated.
2. The line concentrator of claim 1, wherein, said central office unit and remote unit each includes a phase shift modulator and phase shift demodulator, each modulator producing a PSK carrier.

3. The line concentrator of claim 2, wherein, the one demodulator is responsive to the PSK carrier generated by the modulator in the other unit.

4. The line concentrator of claim 3, wherein, said communicating means includes a duplex conductor for carrying said PSK carriers.

5. The line concentrator of claim 4, wherein, the demodulator means in a unit includes a filter for substantially impeding transmission of the carrier from the modulator in said unit to said demodulator.

6. The line concentrator of claim 5, wherein said duplex conductor comprises a balanced line, which is AC coupled to said demodulator and modulator in each of said units.

7. The line concentrator of claim 1, wherein said encoded carriers contain digitally encoded data words and digital error correction words corresponding to said data words.

8. The line concentrator of claim 7, wherein said central office unit and remote unit each includes means for decoding said error correction words, and means for correcting the data words in accordance with said code.

9. The line concentrator of claim 7, wherein said data words include a plurality of data bits, and said error correction words include a plurality of bits, each bit representing the parity relationship for a portion of the words comprised of said data bits and said error correction bits less said bit.

10. The line concentrator of claim 9, wherein said encoded carriers contain a digital word representing the parity relationship between the bits in said data word and said error correction word.

11. The line concentrator of claim 7, including, means in each unit for correcting a data word transmitted from the other unit by reference to said word's error correction word.

12. The line concentrator of claim 9, including, means in each unit for correcting a data word transmitted from the other unit by reference to said word's error correction word.

13. The line concentrator of claim 10, including, means in each unit for correcting a data word transmitted from the other unit by reference to said word's error correction word.

14. A telephone switching system, comprising,
a central office unit,
a remote field unit for connection to a plurality of subscribers,
a lesser plurality of trunk lines connecting said central office unit and field unit,
at least one line in said remote unit for connecting two of said subscribers,
memory means for storing subscriber numbers,
means for identifying a calling subscriber and the number dialed by said subscriber and for comparing said number to said numbers in said memory
means for determining if said subscriber is calling another subscriber connected to the field unit, and
means for first establishing a connection between said subscribers over said trunk lines and upon a determination by said comparing means that both subscribers are connected to said field unit, connecting said subscribers over said one line unit and disestablishing said trunk connections.

15. A line concentrator system comprising:
a central office unit receiving a plurality of incoming subscriber lines,
a remote field unit adapted for connection to the subscribers,
a plurality of trunk lines less than the number of said subscribers,
one line in said remote unit,
means in said remote unit for connecting a subscriber line and a subscriber to one of said trunk lines and two subscribers over said one line under control of said central office unit,
means in said central office unit for connecting a called and calling subscriber over first and second trunk lines and their corresponding subscriber lines upon receiving an off hook interrupt and dialing code from said remote unit,
said means including first means for storing the identity of each subscriber connected to said remote unit, and second means determining from said interrupt, dialing code and said storage means that the called and calling subscribers are connected to said remote unit, generating a control signal sent to said remote unit for establishing connection between said subscribers over said one line and, said second means also generating another control signal to said remote unit and said central office unit for disconnecting the trunk lines connecting the called and calling subscribers and
wherein said first means includes a random access memory, and said second means include a microprocessor.

16. The concentrator described in claim 15, further comprising:
a communications link for transmitting digital control data between said means in said central office and said means in said remote unit on at least two encoded carriers.

17. The concentrator described in claim 16, wherein, said carriers are phase modulated.

18. The concentrator described in claim 16, wherein said communications link includes:
means in each of said central office and said remote units for generating one of said carriers, and
means in each said central office unit and said remote unit for detecting one of said carriers.

19. The concentrator described in claim 18, wherein, said generating means includes a phase shift modulator for generating PSK carriers, and
said detecting means includes a phase detector.

20. The concentrator described in claim 16, wherein, a carrier from said central office unit is detected in said remote unit, and a carrier from said remote unit is detected in said central office.

21. The concentrator described in claim 17, wherein, a carrier from said central office unit is detected in said remote unit, and a carrier from said remote unit is detected in said central office.

22. The concentrator described in claim 18, wherein, a carrier from said central office unit is detected in said remote unit, and a carrier from said remote unit is detected in said central office.

23. The concentrator described in claim 16, further comprising,
means for transmitting a corresponding error correction code with said control data, and error correction means utilizing said error code to correct an error in control data transmitted between said central office unit and field unit.

24. The concentrator described in claim 23, wherein, said control data includes a binary word, and said error correction code comprises a binary word indicating the arrangements of the bits in said control data binary word.

25. The concentrator described in claim 15, wherein said communications link includes means in said remote unit for retransmitting received digital control data to said central office unit for comparison therein between the transmitted and received data for determining if an error has occurred in transmission of said data.

26. The concentrator described in claim 25, wherein, the digital control data transmitted from said central office unit to said remote unit includes two data words, one transmitted subsequent to the other.

27. The concentrator described in claim 26, wherein, said digital control data includes an error correction code for transmission with data sent between said central office unit and said remote unit over said communications link.

28. The concentrator described in claim 27, wherein, said digital control data includes a binary data word comprised of a plurality of bits, and said error correction code comprises a binary word indicating the arrangement of the bits in said control data word.

29. The concentrator described in claim 28, wherein, said digital control word further comprises a binary word indicating the arrangement of said bits in said binary word and said bits in said error correction word.

30. In a telephone switching system comprising:
a central office switching unit,
a plurality of trunk lines which extend from said central office unit,
a remotely located switching unit providing connnection to a plurality of subscribers greater in number than said plurality of said trunk lines over said trunk lines under control of said central office switching unit,
at least one intracall trunk line in said remote unit for providing a connection between subscribers in said unit,
the improvement, comprising,
a communications channel between said units for duplex transmission of digital control information between said remote unit and central office unit on preassigned carriers,
and wherein said communications channel includes means in said central office unit for transmitting a PSK carrier to said remote unit,
means in said remote unit for receiving and detecting the PSK carrier tranamitted from said central office unit,
means in said remote unit for transmitting a PSK carrier to said central office unit, and means in said central office unit for receiving and detecting the PSK carrier from said remote unit.

31. The improvement described in claim 30 wherein, said communications channel includes a common conductive path linking said remote unit and said central office unit and carrying said PSK carriers.

32. The improvement described in claim 31, wherein, said communications channel includes means in said central office unit and said remote unit for separating transmitted and received carriers in each unit.

33. The improvement described in claim 30, further comprising,
means in said central office receiving a subscriber off hook signal from a calling subscriber and an identifier for said subscriber, said means generating a control signal to said central office unit and said remote unit to connect said off hook subscriber to said central office unit over one of said trunk lines,
means for generating a control signal to said central office unit in said remote on a call to a second subscriber for connecting said subscriber to said central office unit over a second trunk line,
means in said central office unit storing the identifiers for each subscriber connected to said remote unit,
means for determining that the calling subscriber is connected to said called subscriber by comparing the identifier for at least said second subscriber with the identifiers in said storage means in said central office,
means in said remote unit for establishing a connection between said off hook subscriber and said called subscriber over said intracall line, said means being responsive to a control signal from said comparison means indicating that the off hook subscriber is connected to said called subscriber, and
means in said central office unit and said remote unit for disestablishing said connections between said subscribers over said trunks substantially simultaneously with the establishment of said intracall connection.

34. The improvement described in claim 30, further comprising,
a random access memory unit containing identifiers for all the subscribers connected to said remote unit,
a microprocessor programmed to compare the identifier for a called number with those in said memory unit when said call originates with another subscriber and generating a control signal when originating subscriber is calling another subscriber, and
means responsive to said control signal for connecting said subscribers over said intracall line.

35. The improvement described in claim 34, further comprising,
means for connecting two subscribers over said trunk lines and disestablishing said connection substantially simultaneously with the establishment of said intracall line under control of said microprocessor.

36. A line concentrator comprising a central office having a central office unit,
a remote field switching unit separately located from said central office unit and adapted for connection to a plurality of subscribers, a lesser plurality of trunk lines connecting said central office and subscribers under the control of said central office,
means for duplex communication of data between said central office and remote unit on a common communications channel utilizing a plurality of encoded carriers.

37. A line concentrator system comprising:
a central office unit receiving a plurality of incoming subscriber lines,
a remote field unit adapted for connection to the subscribers,
a plurality of trunk lines less than the number of said subscribers,
one line in said remote unit, means in said remote unit for connecting a subscriber line and a subscriber to one of said trunk lines and two subscribers over said one line under control of said central office unit, means in said central office unit for connecting a called and calling subscriber over first and second trunk lines and their corresponding subscriber lines upon receiving an off hook interrupt and dialing code from said remote unit, said means including first means for storing the identity of each subscriber connected to said remote unit, and second means determining from said interrupt, dialing code and said storage means that the called and calling subscribers are connected to said remote unit, generating a control signal sent to said remote unit for establishing connection between said subscribers over said one line and, said second means also generating another control signal to said remote unit and said central office unit for disconnecting the trunk lines connecting the called and calling subscribers.

38. In a telephone switching system comprising:
a central office switching unit,
a plurality of trunk lines which extend from said central office unit,
a remotely located switching unit providing connection to a plurality of subscribers greater in number than said plurality of said trunk lines over said trunk lines under control of said central office switching unit,
at least one intracall trunk line in said remote unit for providing a connection between subscribers in said unit,
the improvement, comprising,
a communications channel between said units for the duplex transmission of digital data between said remote unit and central office on preassigned carriers.

* * * * *